(No Model.)
W. M. ASH.
CYCLE CHAIN CLEANER.
No. 577,503.   Patented Feb. 23, 1897.
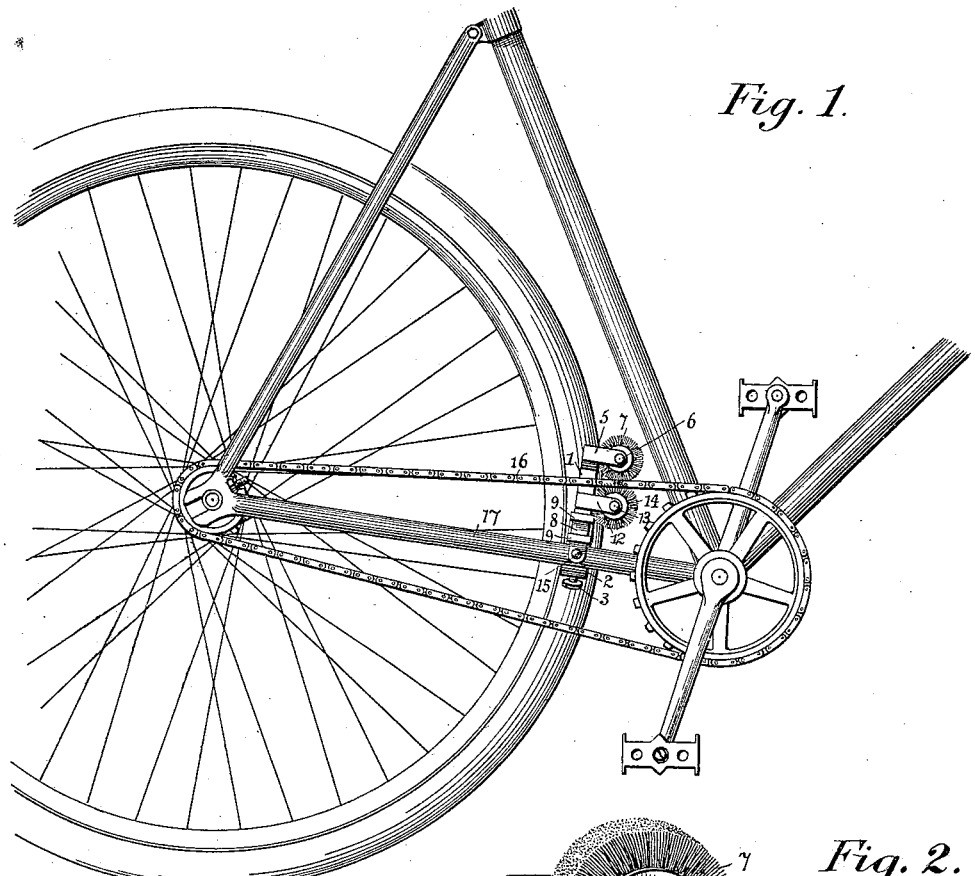
Fig. 1.
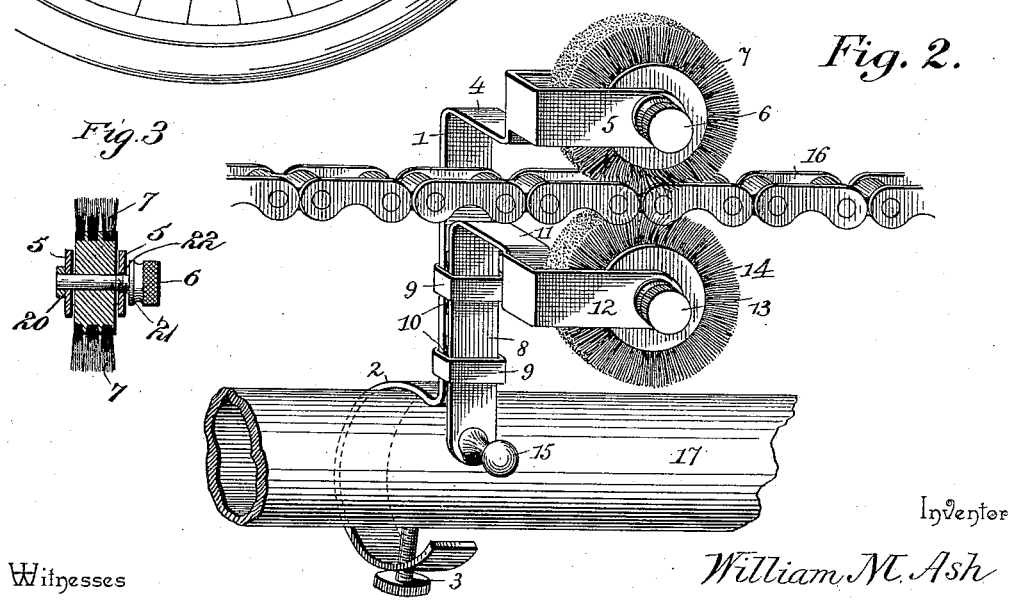
Fig. 2.
Fig. 3.
Witnesses
Chas. H. Durand
R. M. Smith
Inventor
William M. Ash
By his Attorneys,
C. A. Snow & Co.

\# UNITED STATES PATENT OFFICE.

WILLIAM M. ASH, OF WASHINGTON, DISTRICT OF COLUMBIA.

CYCLE-CHAIN CLEANER.

SPECIFICATION forming part of Letters Patent No. 577,503, dated February 23, 1897.

Application filed June 26, 1896. Serial No. 597,030. (No model.)

*To all whom it may concern:*

Be it known that I, WILLIAM M. ASH, a citizen of the United States, residing at Washington, in the District of Columbia, have invented a new and useful Cycle-Chain Cleaner, of which the following is a specification.

This invention relates to cycle-chain cleaners; and the object in view is to provide a simple, light, and efficient cleaning device which is applicable to chain-driven vehicles of any kind, but especially designed for use in connection with the driving-chains of safety-bicycles of modern make, the said device being adjustable, so that it may be brought into the proper relation to the chain and used either for scraping mud from the chain or for removing dust therefrom as it accumulates.

The cleaner may be quickly applied to the bicycle and may be as readily removed when not required.

The invention consists in a cycle-chain cleaner embodying certain novel features and details of construction and arrangement of parts, as hereinafter fully described, illustrated in the drawings, and incorporated in the claims.

In the accompanying drawings, Figure 1 is a side elevation of a sufficient portion of a bicycle to illustrate the application of the improved chain-cleaner thereto. Fig. 2 is a detail perspective view of the cleaning device, showing portions of the frame and chain. Fig. 3 is a detail sectional view on the line 3 3 of Fig. 2.

Similar numerals of reference designate corresponding parts in the several figures of the drawings.

The chain-cleaner contemplated in this invention is in the form of an attachment for bicycles, &c., and comprises a frame 1, which for convenience is made from a strip of metal of the required stiffness, one end thereof being given a semicircular bend to form an attaching-clip 2, through the terminal portion of which is passed a set-screw 3, adapted to bear against one of the frame-bars of the machine for securing the device rigidly thereto. The other end of the frame 1 is bent substantially at a right angle to form an arm 4, which has a certain amount of spring, and at the extremity of this arm spaced parallel ears 5, forming a bearing-yoke, are provided, through which passes a thumb-screw 6. Mounted between said arms and journaled on the thumb-screw 6 is a cleaning-brush 7, which ordinarily revolves, but which may be held stationary by tightening the screw 6, thus causing the ears 5 to bind against the hub portion of the cleaning-brush. The brush may be of any preferred construction and may be provided with the ordinary or wire bristles.

8 designates a slide-bar which is connected to the frame 1 by means of guiding-loops 9, secured rigidly to said frame and permitting the bar 8 to slide therethrough. One or more springs 10 are interposed between the slide-bar 8 and the frame 1 for holding said bar at the proper point of adjustment. One end of the bar 8 is deflected substantially at a right angle to form a spring-arm 11, and the extremity of this arm is provided with spaced ears 12, through which passes a thumb-screw 13, upon which is journaled a second cleaning-brush 14, similar to the above-described brush 7, and also adapted either to revolve or to be clamped stationary. At the opposite end of the bar 8 is a knob or handle 15, by means of which the bar 8 may be adjusted for bringing its brush into contact with the chain, (indicated at 16.)

The thumb-screws 6 and 13 are of the same construction and mounted in the same manner to provide for journaling the rotary brushes in position and also for clamping said brushes against rotation, when desired. Each of the said screws 6 and 13 is suitably swiveled at one extremity, as at 20, in one of the ears receiving the same, and adjacent to its thumb-head each screw is threaded, as at 21, to engage a threaded opening 22 in the ear adjacent to said head. This construction permits of the necessary contraction and spreading of the ears in which the screws are mounted to secure the results already referred to, and is the preferable manner of carrying out this feature of the invention.

The cleaning device above described may be applied to the machine at any desired point either in front of or in rear of the front sprocket. Under the preferred arrangement, however, the frame 1 is attached to one of the bottom runs or rear fork sides 17 on the same side of the machine as the chain. The cleaner is placed in such position that the chain will pass between the two brushes, as shown in the drawings, and the brushes may contact with the chain either above the frame-bar 17 or below it, as preferred, or as may be rendered necessary by the construction of the machine and the amount of slack in the chain. When the chain is covered with mud, the cleaning-brushes may be clamped stationary, so as to scrape the mud therefrom. In dry weather, however, the cleaning-brushes may be left loose, so as to freely revolve, and under this adjustment they will remove dust from the chain as it accumulates thereon, thus keeping the chain alway in perfect running order. The yielding or spring action of the parts in which the cleaning-brushes are mounted insures their proper engagement with the chain and at the same time prevents the brushes from binding against the chain, so as to prevent undue friction. The device may be quickly and easily removed from the machine when desired.

It will be understood that the cleaning device is susceptible of changes in the form, proportion, and minor details of construction, which may accordingly be resorted to without departing from the spirit or sacrificing any of the advantages of this invention.

Having thus described the invention, what is claimed as new is—

1. A chain-cleaner comprising an upright frame or support having upper and lower relatively-adjustable bearing-yokes, cleaning-brushes mounted for rotation in said yokes, and a clamping device for each brush to secure the same against rotation, substantially as set forth.

2. A chain-cleaner comprising a frame or support having a bearing-yoke, a cleaning-brush arranged to rotate within said bearing-yoke, and a journal-forming thumb-screw connecting the opposite ears of the bearing-yoke and forming a journal-support for the brush and also a clamping device to secure the brush against rotation, substantially as set forth.

In testimony that I claim the foregoing as my own I have hereto affixed my signature in the presence of two witnesses.

WILLIAM M. ASH.

Witnesses:
 JAMES R. ASH,
 J. H. SIGGERS.